United States Patent
Ragland

(10) Patent No.: US 10,534,958 B1
(45) Date of Patent: Jan. 14, 2020

(54) EVENTS AND DATA MANAGEMENT PLATFORM

(71) Applicant: Christopher Clark Ragland, Rogers, AR (US)

(72) Inventor: Christopher Clark Ragland, Rogers, AR (US)

(73) Assignee: Axxiom Consulting LLC, Salisbury, MD (US)

( * ) Notice: Subject to any disclaimer, the term of this patent is extended or adjusted under 35 U.S.C. 154(b) by 0 days.

(21) Appl. No.: 15/717,886

(22) Filed: Sep. 27, 2017

Related U.S. Application Data

(60) Provisional application No. 62/400,280, filed on Sep. 27, 2016.

(51) Int. Cl.
*G06K 9/00* (2006.01)
*G06F 9/54* (2006.01)
*A01K 29/00* (2006.01)
*G06F 3/0484* (2013.01)

(52) U.S. Cl.
CPC .......... *G06K 9/00617* (2013.01); *A01K 29/00* (2013.01); *G06F 3/0484* (2013.01); *G06F 9/542* (2013.01); *G06K 9/00604* (2013.01)

(58) Field of Classification Search
CPC ............ G06K 9/00617; G06K 9/00604; G06F 3/0484; G06F 9/542; A01K 29/00
See application file for complete search history.

(56) References Cited

U.S. PATENT DOCUMENTS

| | | | | |
|---|---|---|---|---|
| 6,424,727 B1 * | 7/2002 | Musgrave | ............ | A01K 11/006 382/116 |
| 6,532,298 B1 * | 3/2003 | Cambier | ............... | A01K 11/006 382/117 |
| 7,455,224 B2 | 11/2008 | Kochevar et al. | | |
| 8,812,476 B2 | 8/2014 | Hope et al. | | |
| 9,137,247 B2 | 9/2015 | Smith et al. | | |
| 9,298,756 B1 | 3/2016 | Johnson | | |
| 2001/0044336 A1 * | 11/2001 | Reiss | ....................... | G07F 17/32 463/17 |
| 2003/0228604 A1 * | 12/2003 | Plastow | ............... | C12Q 1/6888 435/6.1 |
| 2007/0288249 A1 * | 12/2007 | Rowe | ................... | A01K 1/0023 705/7.11 |
| 2012/0265702 A1 | 10/2012 | Maher | | |
| 2014/0282945 A1 * | 9/2014 | Smith | ...................... | G06F 21/32 726/6 |
| 2015/0082024 A1 | 3/2015 | Smith | | |
| 2017/0037482 A1 * | 2/2017 | Christa | ................ | C12Q 1/6888 |
| 2018/0092605 A1 * | 4/2018 | Schaevitz | ............ | A61B 5/7275 |
| 2018/0350144 A1 * | 12/2018 | Rathod | ................. | H04W 4/029 |

* cited by examiner

*Primary Examiner* — Bobbak Safaipour
(74) *Attorney, Agent, or Firm* — Lathrop Gage L.L.P.

(57) ABSTRACT

An events and data management system includes a computing device having a processor, an input device, an output device; and memory. The system further includes an external input device communicatively coupled to the computing device over a network. The memory stores information from the computing device and the input device; and a user accesses the information on the computing device via a graphical user interface.

20 Claims, 4 Drawing Sheets

US 10,534,958 B1

EVENTS AND DATA MANAGEMENT PLATFORM

CROSS-REFERENCE TO RELATED APPLICATIONS

This application claims priority to U.S. Provisional Patent Application No. 62/400,280, filed Sep. 27, 2016, the entirety of which is incorporated herein by reference.

BACKGROUND

Databases are often used to electronically store large amounts of data. Unfortunately, it often requires several databases, each separately accessed, in order to store all of the desired information. For instance, for membership associations, separate databases may be required to keep track of membership records, records related to events that a company may sponsor, including, where applicable, results from competitions, volunteers, participants, etc. Indeed, all different kinds and amounts of information are stored in databases.

While strides in computer technology have certainly increased people's ability to store and access data, as technology increases, so do customer's expectations of convenience, responsiveness, and access to information. This is also true of the information stored on databases. In other words, customers expect to be able to quickly and efficiently access stored information from remote devices. Unfortunately, many small businesses struggle to justify the initial investment required to develop a robust software solution, or are unable to maintain their current technology offerings. This results in a subpar client experience.

Member associations, in particular, are prone to experience difficulties in developing and maintaining current technology offerings, both due to cost, and the amount of data that is often preserved. Manual systems are frequently used for membership and animal registration, ownership transfers, event registration, scoring, results reporting, etc. This generally leads to excessive delay between the date of an event to the date the results are posted, the amount of manpower needed to process the data, and an inability to process and manage multiple sets of data at once.

A core data management platform, ideally web-based and accessible from mobile technology, and optionally hosted and managed by a third-party capable of managing the data input and output is desirable.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In one embodiment, an events and data management system includes a computing device having a processor, an input device, an output device; and memory. The system further includes an external input device communicatively coupled to the computing device over a network. The memory stores information from the computing device and the input device; and a user accesses the information on the computing device via a graphical user interface embodied in a personal remote computer.

DETAILED DESCRIPTION

Figure 1:
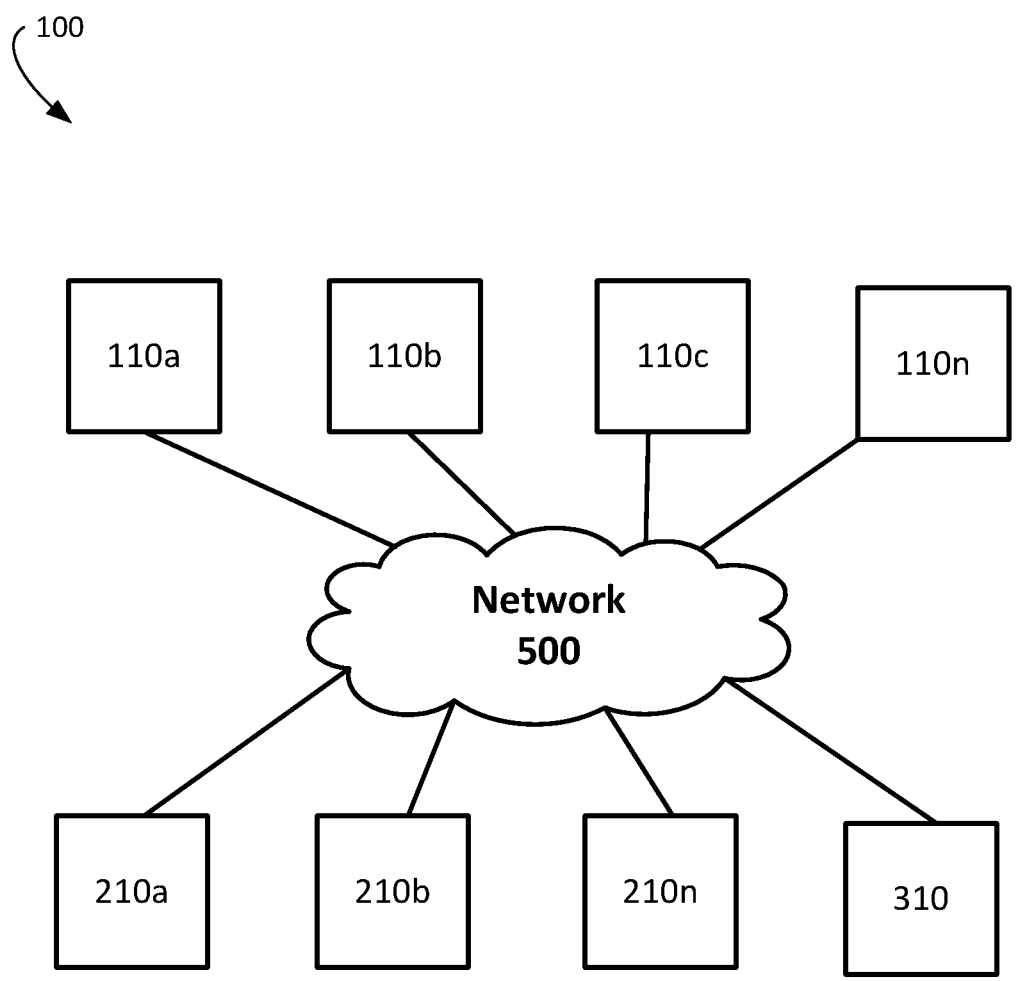
FIG. 1 is a schematic diagram of an events data and management platform according to an embodiment of the invention.

Previously, performance organizations wanted to capture data (e.g., events data) and manipulate it to provide consumers with easy-to-use and up-to-date information. However, capturing data, entering that data into an electronic form, and even providing useful manipulation was too costly and time consuming because it is usually entered manually. Further, even if the data could be electronically accessed, there were no standardized reports, so the information appeared disorganized or difficult to read and easily understand. The information is also usually not up-to-date, because of the substantial time and manpower required to enter the data. It is therefore clear that a platform for receiving, manipulating, and storing data would be useful. Ideally, the platform would be web-based such that it can be accessed from many different devices, including mobile devices. The platform may be hosted by a third-party which is capable of managing registration information, transfer information (e.g., ownership data), events managements, providing results publications, and other services.

A data events platform suited for use by membership associations is described herein. The invention described herein overcomes many of the problems with existing data storage and management systems and obtains its objectives by providing an integrated system embodied in computer hardware and software for the rapid, efficient collection, storage, and management of data, thereby allowing for rapid, efficient, and accurate data retrieval by consumers and association personnel that can be up kept very cost effectively.

For purposes of discussion, the platform is described in use in the equine industry. However, those of skill in the art shall understand that the events platform may be utilized in a number of different ways across a wide variety of industries, and may even serve as a cross-industry data platform. Referring to the use of the platform in the equine industry, the events platform may be suitable for use by national, regional, and/or local breed and performance associations, professional events management firms (e.g., firms that sponsor shows, sales, races, etc.), veterinary health departments (local, national, or even worldwide), animal owners, or even prospective animal owners.

In embodiments, the novel system is designed to have one or more core functional components. The events platform may have various functional aspects including but not limited to:

i. A front-end data collection site for receiving animal, membership and event registration information; animal transfer requests; and fee collection;
  ii. Accessibility over a network via links embedded within participating association pages, or via a dedicated events page;

iii. A mobile application designed for use by, as appropriate, events administrators, judges, ring stewards, state veterinary heath department officials, or other users who may be managing the input of information into the portal;

iv. Automated data uploads to and from participating entities reflecting daily activity updates on, for example, membership, animal registration, animal transfer requests, applicable events updates, etc.;

v. Hardware (and the related software) for data input, including but not limited to iris scanning cameras, barcode readers, weight scales, etc.;

vi. Integrated results capture and reporting capabilities, including the ability to link pedigree, ownership, and performance histories for individual animals based on a given animal's registration number or iris scan information;

vii. Capability to receive and maintain SMART ICVI (interstate certificates of veterinary inspection) documents and other documents required for animal transport or event participation; and viii. Fee-based online consumer services, including but not limited to event registration, animal registration, membership registration and associated fee payments, purchase of animal history reports, etc.

The system described herein is thus configured to improve the availability, efficiency, and operating expense associated with management of significant amounts of data.

FIG. 1 shows an exemplary events display system 100 for importing, exporting, transferring, managing, and/or storing data. The system 100 includes one or more computing devices 110, input devices 210, and storage 310 communicatively coupled together to form the system 100. As described below in greater detail, the system components 110, 210, 310, etc. may be connected over a network 500 (e.g., a wireless network). In embodiments, a computing device 110a may be a dedicated computing device adapted to generate and configure content in line with the teachings of the present disclosure. The computing device 110a may be remotely located and supported by a third party to update the platform as necessary. Additional computing devices 110b, 110c, . . . 110n may be personal devices, such as cellular phones, laptop computers, personal data assistants (PDAs), or other personal devices now known or later developed, and may be in communication over the network 500 as described herein.

Figure 2:
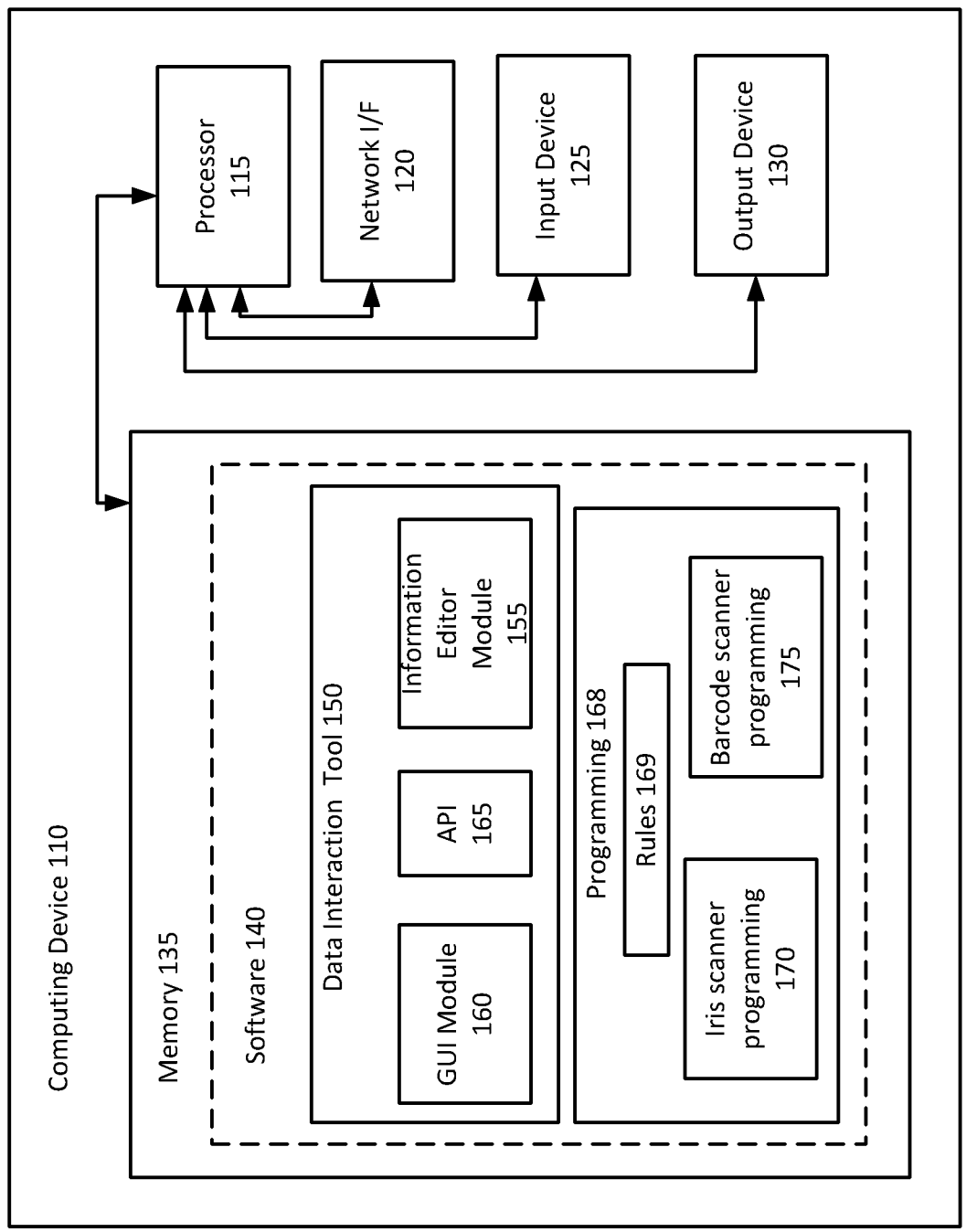
FIG. 2 is a schematic diagram of a computing device of the events data and management platform according to FIG. 1.

Referring now to FIG. 2, each computing device 110 may include a processor 115 in data communication with a network interface 120, at least one input device 125, an output device 130, and a memory 135. The processor 115 represents one or more digital processors. Network interface 120 may be implemented as one or both of a wired network interface and a wireless network interface, as is known in the art. The input device 125 may include a keyboard, a mouse, a stylus pen, buttons, knobs, switches, and/or any other device that may allow a user to provide an input to the system 100 via the computing device 110. In some embodiments, the input device 125 may comprise a media port (such as a USB port, or a SD or microSD port) to allow for media (e.g., a USB drive, a SD or microSD drive, laptop memory, smart phone memory, etc.) to be communicatively coupled to the computing device. The output device 130 may include one or more visual indicators (e.g., a display), audible indicators (e.g., speakers), or any other such output device now known or subsequently developed. In some embodiments, at least a part of the input device 125 and the output device 130 may be combined. A user may functionally interact with the system 100 via the input device 125 and the output device 130.

Memory 135 represents one or more of volatile memory (e.g., RAM) and non-volatile memory (e.g., ROM, FLASH, magnetic media, optical media, etc.). Although shown within the computing device 110, memory 135 may be, at least in part, implemented as a network storage that is external to the computing device 110 and accessed via the network interface 120. The memory 135 may house software 140, which may be stored in a transitory or non-transitory portion of the memory 135. Software 140 includes machine readable instructions that are executed by processor 115 to perform the functions described herein. In one embodiment, the processor 115 may be configured through particularly configured hardware, such as an application specific integrated circuit (ASIC), field-programmable gate array (FPGA), etc., and/or through execution of software (e.g., software 140) to perform functions in accordance with the disclosure herein.

The software 140 may include an data interaction tool 150. The data interaction tool 150 may, in embodiments, be an "application", such as a mobile application configured for personal computing devices, such as an Android, Apple, or other device, a computer application configured for a desktop or mobile computer, etc. Alternately, or additionally, in embodiments, the data interaction tool 150 may be accessible over the network 500 (e.g., over the Internet or website, over an intranet, etc.). The data interaction tool 150 may include one or more of the following: information editor module 155, a graphical user interface (GUI) module 160, and one or more Application Programming Interfaces ("API") 165. A module may be a portion of a computer program and include instructions for performing a particular function. Additional modules may optionally be included to improve the functionality of the system 100 as shall be understood by those of skill in the art.

The computing device 110a, via the API 165, may selectively communicate over the network 500 with additional input devices 210a, 210b, 210n. The input devices 210a, 210b, 210n may be any device which may be communicatively coupled with the computing device 110a. In embodiments, the input devices 210a, 210b, 210n may be one or more of an iris scanning device, a barcode scanner, a scale, or other remote devices for providing data to the system, as described in greater detail below.

As is known in the art, an iris scanner may be useful to verify the identity of an animal. While DNA evidence is the most accurate way of ensuring the correct identity of an animal (e.g., to ensure that the correct animal is entered into a race, that medical records are associated with the correct animal, etc.), taking and comparing DNA samples is expensive and time consuming, and is therefore not practical. The iris scanner may be used to create an initial iris scan profile for each animal which may be stored in the memory 135 (or an external memory database 310). In an example, when an animal is checked into an event, a user, via an iris scanner, may take a second iris scan. Programming 170 stored in the memory 135 may compare the second iris scan with the iris scan profile stored in the memory 135. If the comparison is within a predetermined threshold (e.g., 90% accurate, 95% accurate, etc.), then the animal may be allowed entry into an event. Optionally, if the comparison is outside the predetermined threshold, an alert may be provided to a user's personal computing device 110 (e.g., via output device 130) directing the user to repeat the process to ensure that the program 170 does not give a false negative. If the threshold is again not met, the animal may be denied entrance into the event. Similarly, an iris scanner may be used to identify an animal for the purposes of entering medical records into the system 100, or for other identification purposes, as may be appropriate.

A barcode scanner may additionally be provided to scan barcodes which may be included as part of an individual identification card associated with each animal. The animal's owner or guardian may present the individual identification card, for example, to an event administrator who may scan the barcode provided thereon. Once the barcode is scanned, programming 175 may allow for access to selective information about the animal including identification information to ensure the identity of the animal. Each individual identification card may include a profile photo of the animal, as well as other key identification details (e.g., coat color, markings, height, weight, owner, etc.) which an event administrator may be able to use to verify the identity of the animal, even absent an iris scanner or other electronic identification devices.

Still further, cameras may be in wireless communication with the computing device over the network 500 to provide information to the platform. The cameras may be used remotely by, for example, veterinarians to view animals and provide instructions to the animal's caretaker. Other electronic medical devices, such as thermometers, weight scales, glucose monitors, blood pressure monitors, as well any other electronic devices now known or later developed, may additionally, or alternately, be in communication (e.g., over the network 500) for providing information into the platform.

Yet another device 210 which may be implemented as part of the system 100 is an electronic timer. The timer may record, for example, race results, which may be automatically uploaded onto the platform to provide real-time preliminary results of an event. The results may be independently confirmed, e.g., by a third party, such as the association hosting the event, and official race results may be released at a later time.

Still further external input devices 210 may be implemented as part of the system 100, as will be understood by those of skill in the art.

Information may be automatically uploaded onto the platform (e.g., into the memory 135 and/or 310) from the various input devices 210 and individual computing devices 110, or may be pushed to the platform manually (e.g., when a user uploads the information from the respective device onto the platform, as is known to those of skill in the art). The information, upon receipt, may be sorted based on predetermined rules 169 stored in the program 168 (FIG. 2). For example, the programming 168 may include rules 169 for sorting information based on the breed of the animal, alphabetically, based on geographic location, etc. The data may be sorted into several different categories and stored in the database 310 (or memory 135).

The sorted information stored on the storage 310 may be automatically (e.g., based on programming 168) or manually (e.g., from the third party manager of the platform) pushed to the individual memories 135 of each computing device 110 at regular intervals (e.g., once per day, once per hour, etc.). Those of skill in the art shall understand that by pushing the information to the individual memories 135, the consumer may be able to access the desired information even faster (e.g., because the user does not have to access the network 500). Optionally, the information may be selectively pushed to the computing device 110 based on a user's clearance level. For example, an owner may only receive information related to an animal that it is associated with.

Figure 3:
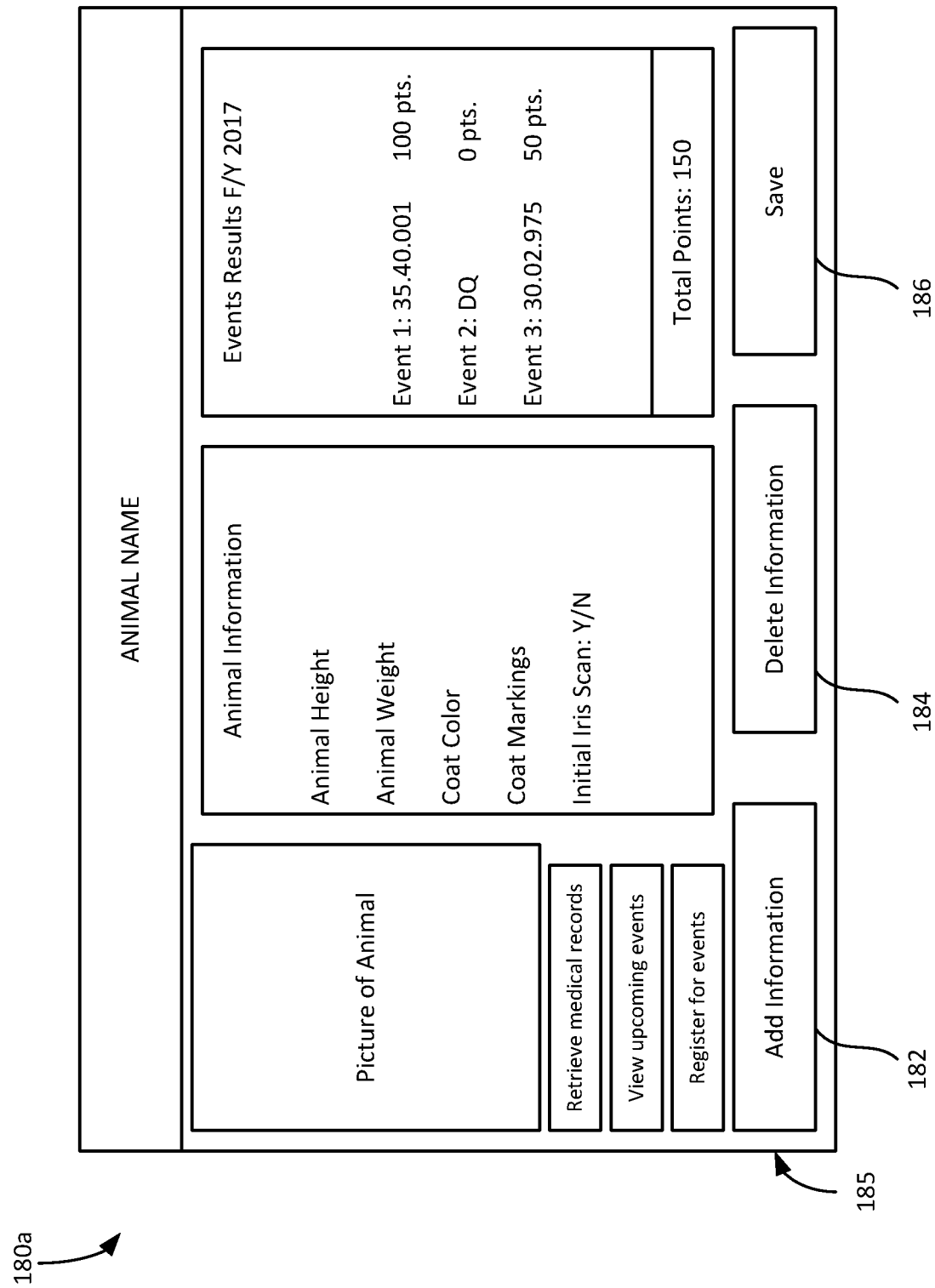
FIG. 3 is a schematic of a graphical user interface of the computing device according to FIG. 2.
Figure 4:
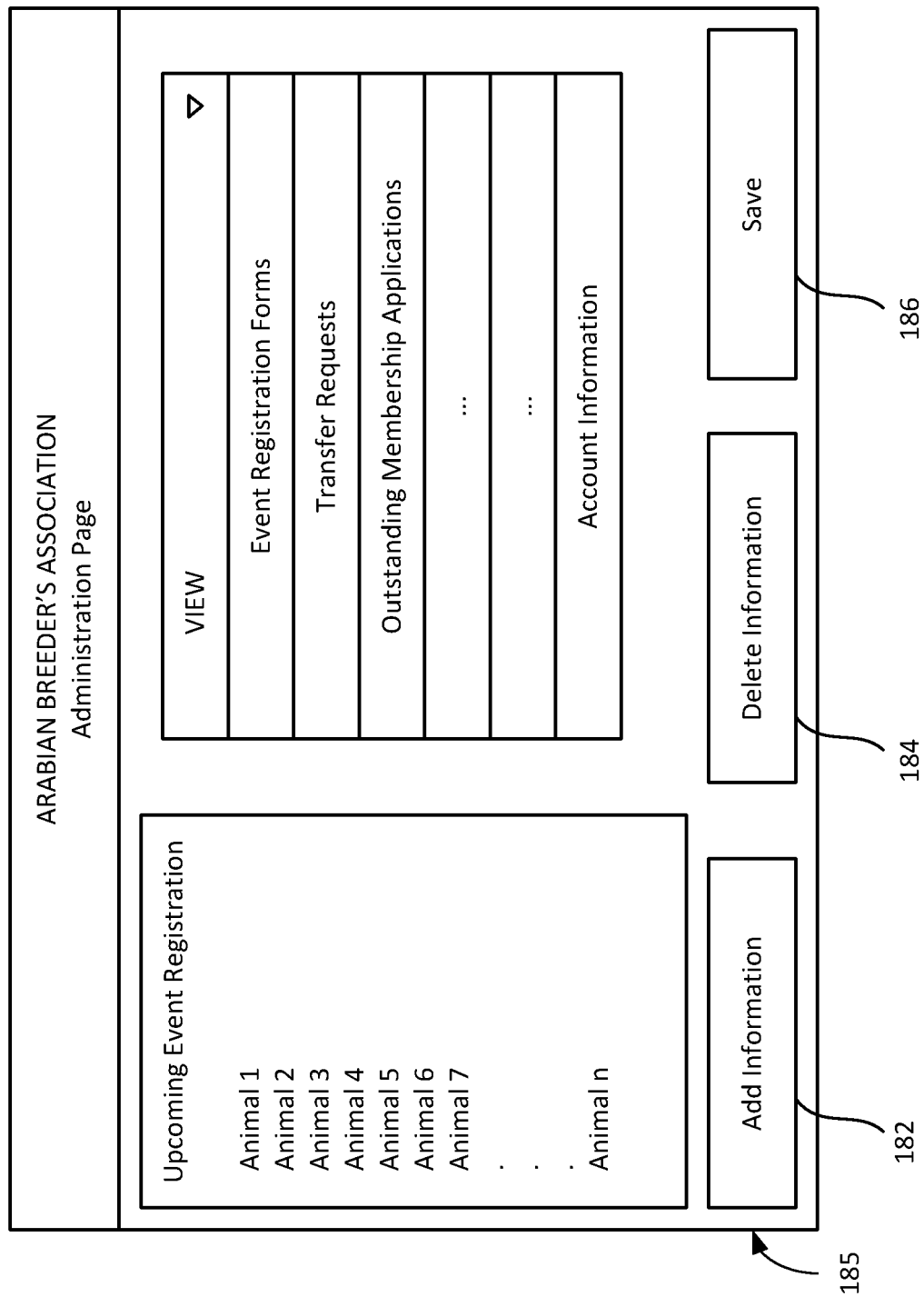
FIG. 4 is a schematic of an alternative graphical user interface of the computing device according to FIG. 2.

Methods of configuring an events display platform are now described with reference to FIGS. 3 and 4. FIG. 3 illustrates an example graphical user interface 180*a* of the data interaction tool 150 generated by the GUI module 160 (FIG. 2). A user (e.g., an animal owner, an animal purchaser, an events coordinator, etc.) may interact with the data interaction tool 150 via the interface 180 and the input and output devices 125, 130, respectively. The data interaction tool 150 may, in turn, configure an informational platform visible to the user with the desired information.

In embodiments, the graphical user interface 180 of the data interaction tool 150 may include an information editor area 185 for manually inputting information about a particular event, animal, etc. For example, in an embodiment, the information editor area 185 may allow a user to update time and location data for an event, manually update information about a particular animal (e.g., update ownership information, event participation, etc.), or provide other manual updates. In embodiments, entry and/or generation of information in the information editor area 185 of the interface 180 may be facilitated by the information editor module 155. Those of skill in the art will understand that the actual information shown in FIG. 3, and the types thereof, is merely exemplary and is not intended to be independently limiting. Additionally, those of skill in the art will understand that the graphical user interface 180 may be configured based on the user. For example, an animal owner may see the interface 180, illustrated in FIG. 3.

However, a system administrator may see a different GUI 180 that is specifically tailored to the information requested by the administrator. FIG. 4 illustrates an exemplary GUI 180*b* that may be seen, for example, by a systems administrator for the Arabian Breeder's Association. The administrator may be able to see upcoming event registration information, as well as information related to the general membership, association accounts, etc. In embodiments, the administrator may be able to select the results that are shown from a drop-down menu, as is known in the art.

In embodiments, control keys may be disposed on the graphical user interface. Example buttons may include an "add information" button 182, a "delete information" button 184, and a "save" button 186, and/or other buttons as may be appropriate. The add information button may allow the user to manually input information; the delete information button may allow the user to delete information that is already stored in the system; and the save button may allow the changes to be saved in memory (e.g., memory 135).

Those of skill in the art shall recognize that it may be undesirable for anyone to be able to manually update information stored on the platform. Accordingly, each user may have unique identification information (e.g., a unique log-in including a username and password, an identification number, a pin, etc.) which the user may input in order to gain access to the system 100. The system 100 may be programmed (e.g., via programming 168) such that each user is uniquely granted access to certain areas within the platform (e.g., may only be granted access alter information for an animal that is confirmed to be owned by the user). In embodiments, as described above, each animal may have a unique identification card, which may be scanned by a user in order to update information for that particular animal.

Once a user has been identified and granted the appropriate access into the system 100, the user may interact with the graphical user interface 180 to access and modify the information. In embodiments, the user may be able to retrieve hard documents (e.g., by sending the information to a printer in communication with the computing device, e.g., over the network 500). Users may additionally be able to access event registration applications in order to sign one or more animals up for an event, and may further be able to pay electronically through communication with an e-commerce platform (e.g., Apple pay, Pay Pal, etc.).

As noted above, the memory may be implemented as network storage 600 accessed via the network interface 500. Accordingly, multiple users may be able to access the information stored on the memory 310 by accessing the network interface 500 (e.g., through a website) at the same time via computing devices 110b, 110c, 110n. All of the information may be stored on the memory 310 and managed by a third party with access and control over the platform via a computing device 110a.

Because information is constantly being received (e.g., from the input devices 210a, 210b, 210n, as described herein) and stored in the memory 310, information may be in a constant state of flux. However, real-time access to data allows users to regularly keep up with the most up-to-date information stored in the system 100. Further, because the various input mechanisms allow for near real-time storage of data onto the platform, the information is almost always kept up-to-date without the need for manual input of data. Users may thus be able to view the number of entries, e.g., per class, prior to and during an event. Additionally, the ability to wirelessly send information from the respective input device directly onto the platform eliminates wasteful paperwork, including the paperwork that may be generated both during and after an event, and after an event. Still further, the results are less prone to error due to the fact that humans are not required to enter the data into the system.

Still further, the platform may include programming (e.g., programming 168) capable of calculating points for each animal. The points may be determined based on many types of criteria, including but not limited to, for example, how many events an animal participates in during a calendar year, how the animal finishes in each of the events (e.g., 100 points for $1^{st}$ place, 75 points for $2^{nd}$ place, etc.), whether the animal is up-to-date on all vaccinations, etc. The platform may be able to access the points for each animal to determine whether the animal qualifies (e.g., meets a threshold number of points) for certain events. For example, in order to compete in an event, an animal may be required to a mass 1,000 points in a calendar year. If the animal does not meet the threshold, the user may not be able to register the animal to compete in the event. However, if the animal does meet the threshold, the user may be able to complete the registration over the platform (e.g., via the graphical user interface described above).

The platform may be further capable of being configured to sort information based on, for example, a particular event, a particular breed, or membership in an association. Accordingly, a user may be able to find information tailored to a particular need at a certain time, rather than having to sift through volumes of information which may or may not be stored electronically. Access to the platform will therefore provide each user with an efficient and simple way to access up-to-date information for whatever information the user is looking for.

In embodiments, the platform may be further enhanced by including information from medical data service providers. The medical data service provider may be able to access the platform to implement access (e.g., by medical service professional) to veterinary scripts, electronic necropsy records. Veterinarians may be able to conduct remote health diagnostics (e.g., using an input device, such as a camera, thermometer, or other electronic medical device, as described above), to conduct disease surveillance, and to access, prepare and manage medical records, for example, through the platform 100 via access over the network 500 by a computing device 110, as described above.

Many different arrangements of the described invention are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention.

Further, it will be understood that certain features and subcombinations are of utility and may be employed without reference to other features and subcombinations and are contemplated within the scope of the claims. Not all steps listed in the various figures and description need to be carried out in the specific order described. The description should not be restricted to the specific described embodiments.

The invention claimed is:

1. An events and data management platform system, comprising:
   a computing device, comprising:
      a processor;
      an input device;
      an output device; and
      memory comprising machine readable instructions;
   a first biological information acquisition device communicatively coupled to the computing device over a network;
   at least one event observation device communicatively coupled to the computing device over the network;
   wherein the machine readable instructions, when executed by the processor, perform the following steps:
      a) determine a first biological attribute of an animal via the first biological information acquisition device;
      b) determine a first observation of the animal at a first event via the at least one event observation device;
      c) store the first biological attribute and the first observation of the animal in the memory;
      d) assign a point value to the animal based on the first biological attribute and the first observation stored in the memory, and store the assigned point value in the memory in association with the first biological attribute of the animal;
      e) determine a second observation of the animal at a second event via the at least one event observation device;
      f) store the second observation of the animal in the memory;
      g) update the point value assigned to the animal based on the second observation of the animal stored in the memory, and store the updated point value in the memory in association with the first biological attribute of the animal; and
   wherein a user accesses the information stored in the memory via a graphical user interface embodied in a remote personal computer communicatively coupled to the computing device over the network.

2. The system of claim 1, wherein the biological information acquisition device is an iris scanning device.

3. The system of claim 2, wherein the iris scanning device retrieves an initial iris scan from the animal, the initial iris scan being stored in the memory.

4. The system of claim 3, wherein the iris scanning device retrieves a second iris scan from the animal, and wherein the computing device accesses the initial iris scan and compares the second iris scan to the initial iris scan to verify the identity of the animal.

5. The system of claim 4, wherein the identity of the animal is verified if the comparison of the initial iris scan and the second iris scan yields a similarity value that exceeds a predetermined threshold.

6. The system of claim 5, wherein verification of the identity of the animal is a prerequisite to entry into the event.

7. The system of claim 1, wherein information stored in the memory is selectively altered by the user of the personal computer.

8. The system of claim 7, wherein the user has a unique identifier, the unique identifier being used to access at least a portion of the memory via the graphical user interface.

9. The system of claim 1, further comprising a second biological information acquisition device, wherein the machine readable instructions, when executed by the processor, further perform the following steps:
   h) determine a second biological attribute of the animal via the second biological information acquisition device;
   i) access the updated point value from the memory and revise the updated point value based on the second biological attribute; and
   j) store the revised updated point value in the memory in association with the first biological attribute of the animal.

10. The system of claim 9, wherein the first biological attribute is an iris scan profile of the animal.

11. The system of claim 10, wherein the second biological information acquisition device is one of a scale and a camera.

12. The system of claim 11, wherein the second biological information acquisition device is a scale and wherein the second biological attribute a weight of the animal.

13. The system of claim 9, wherein the first biological attribute is compared against an initial biological attribute of the animal stored in the memory, and wherein the animal is granted access to the event if the first biological attribute is within a predetermined threshold of the initial biological attribute.

14. The system of claim 13, further comprising a barcode scanner, wherein the barcode scanner is operable to scan a barcode on an animal identification card associated with the animal, and wherein scanning the barcode on the animal identification card reveals an observable biological attribute of the animal stored in the memory in association with the barcode of the animal identification card.

15. The system of claim 14, wherein the animal is granted access to the event if the observable biological attribute of the animal is present on the animal as seen by an observer.

16. The system of claim 9, wherein the machine readable instructions, when executed by the processor, further performs the following steps:
   h) generate a record based on the first biological attribute of the animal, the second biological attribute of the animal, the respective observations of the animal; and the respective point values assigned to the animal;
   i) store the record in the memory for access by the user via the remote personal computer.

17. The system of claim 9, further comprising a barcode scanner, wherein the barcode scanner is operable to scan a barcode on an animal identification card associated with the animal, and wherein scanning the barcode on the animal identification card reveals an observable biological attribute of the animal stored in the memory in association with the barcode of the animal identification card.

18. The system of claim 17, wherein the animal is granted access to the event if the observable biological attribute of the animal is present on the animal as seen by an observer.

19. The system of claim 18, wherein the observable biological attribute of the animal is a marking on the animal's coat.

20. The system of claim 1, wherein the event observation device is a timer.

* * * * *